United States Patent
Li et al.

(10) Patent No.: US 10,453,180 B2
(45) Date of Patent: Oct. 22, 2019

(54) DYNAMIC PICTURE SIZING BASED ON USER ACCESS CRITERIA

(71) Applicant: International Business Machines Corporation, Armonk, NY (US)

(72) Inventors: Jenny S. Li, Danbury, CT (US); Robert J. Paquin, Wappingers Falls, NY (US); Conor D. Proce, Garden City, NY (US); Philip A. Siconolfi, Wappingers Falls, NY (US); Matthew J. Webber, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 11 days.

(21) Appl. No.: 15/609,318

(22) Filed: May 31, 2017

(65) Prior Publication Data

US 2018/0350033 A1    Dec. 6, 2018

(51) Int. Cl.
*G06T 3/40* (2006.01)
*H04N 1/40* (2006.01)

(52) U.S. Cl.
CPC ....... *G06T 3/4092* (2013.01); *H04N 1/40068* (2013.01)

(58) Field of Classification Search
CPC .......................... G06T 3/4092; H04N 1/40068
See application file for complete search history.

(56) References Cited

U.S. PATENT DOCUMENTS

| 7,038,701 | B2 | 5/2006 | Niemi |
| 7,248,262 | B2 | 7/2007 | Cao |
| 7,631,259 | B2 | 12/2009 | Kirn et al. |
| 2002/0016818 | A1 | 2/2002 | Kirani et al. |
| 2008/0189625 | A1 | 8/2008 | Zuta et al. |
| 2013/0166391 | A1* | 6/2013 | Blow ..................... H04L 67/06 705/14.66 |

(Continued)

FOREIGN PATENT DOCUMENTS

| CN | 101667978 A | 3/2010 |
| CN | 103412928 A | 11/2013 |

(Continued)

OTHER PUBLICATIONS

Jenny S. Li, et al., Pending U.S. Appl. No. 15/797,363 entitled "Dynamic Picture Sizing Based on User Access Criteria," filed Oct. 30, 2017.

(Continued)

*Primary Examiner* — Matthew Salvucci
(74) *Attorney, Agent, or Firm* — Cantor Colburn LLP; Steven Chiu

(57) ABSTRACT

Aspects of the invention include intercepting a rendering of a picture at a website, the picture uploaded to a server of the website by a content provider. Access criteria associated with a user at a user device is determined. The access criteria includes a relationship between the user and one or both of the content provider and content of the picture. A resolution of a modified rendering of the picture is determined based at least in part on the access criteria. The modified rendering of the picture is generated based at least in part on the resolution. The modified rendering of the picture is displayed at the user device.

11 Claims, 6 Drawing Sheets

(56) References Cited

U.S. PATENT DOCUMENTS

| | | | |
|---|---|---|---|
| 2014/0189056 A1* | 7/2014 | St. Clair | H04L 67/303 |
| | | | 709/217 |
| 2015/0286897 A1 | 10/2015 | Spaith | |
| 2015/0365491 A1* | 12/2015 | Chan | G06F 17/30085 |
| | | | 709/219 |

FOREIGN PATENT DOCUMENTS

| | | | | |
|---|---|---|---|---|
| CN | 103984781 A | 8/2014 | | |
| CN | 106227825 A | 12/2016 | | |
| KR | 101017935 B1 | 3/2011 | | |
| WO | 2014106183 A1 | 7/2014 | | |
| WO | WO 2014/106183 | * | 7/2014 | G06F 1/32 |

OTHER PUBLICATIONS

List of IBM Patents or Patent Applictions Treated as Related; (Appendix P), Filed Oct. 30, 2017, 2 pages.
International Search Report and Written Opinion for Internation Application No. PCT/IB2018/053809; International Filing Date: May 29, 2018; dated Jul. 30, 2018; 9 pages.

* cited by examiner

DYNAMIC PICTURE SIZING BASED ON USER ACCESS CRITERIA

BACKGROUND

Embodiments of the invention relate in general to viewing pictures on a website, and more specifically to dynamic picture sizing based on user access criteria.

Typically, pictures that are viewed online are of reduced quality, or lower resolution. When a user wants to zoom-in on a section of a picture, it can often appear pixilated and blurry because the picture being viewed is not the original full resolution picture. However, if the picture is of high resolution, it can take longer to load the image from the website and it can require more bandwidth, which can be costly for mobile users with limited data and can slow down the speed of website content browsing.

SUMMARY

Embodiments of the invention include methods, systems, and computer program products for dynamic picture sizing based on user access criteria. A non-limiting example method includes intercepting a rendering of a picture at a website, the picture uploaded to a server of the website by a content provider. Access criteria associated with a user at a user device is determined. The access criteria includes a relationship between the user and one or both of the content provider and content of the picture. A resolution of a modified rendering of the picture is determined based at least in part on the access criteria. The modified rendering of the picture is generated based at least in part on the resolution. The modified rendering of the picture is displayed at the user device.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
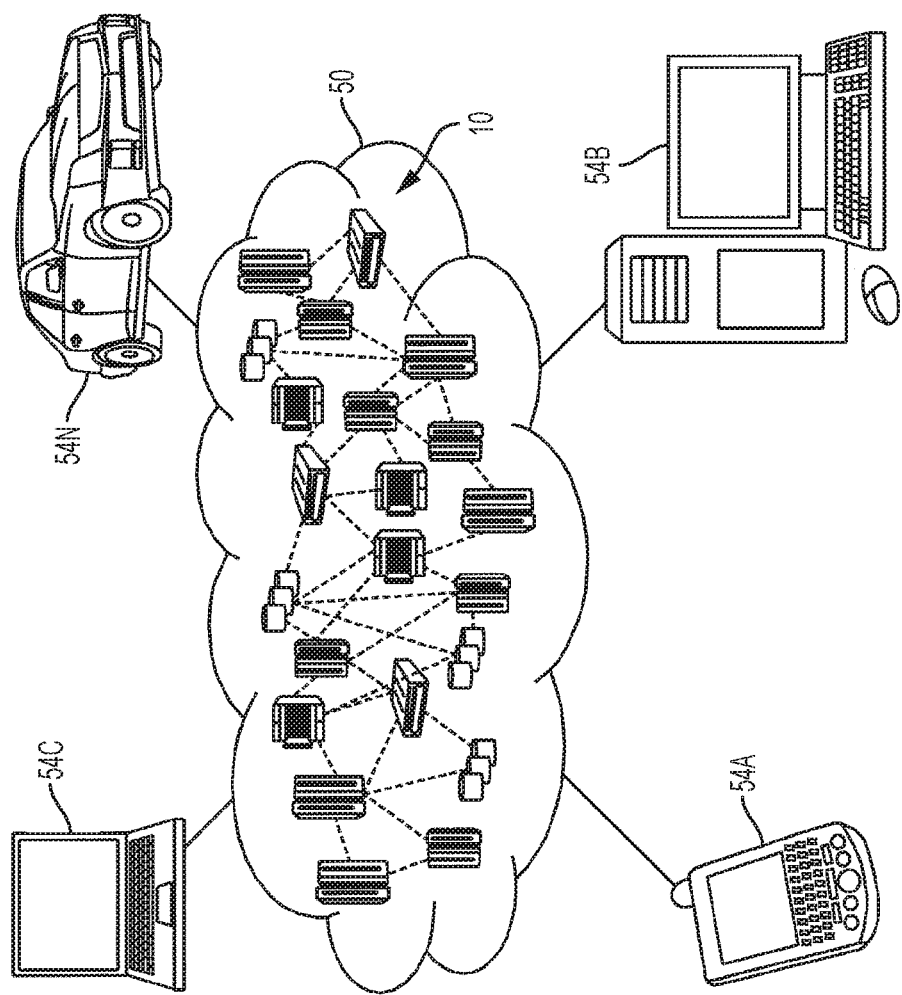
FIG. 1 depicts a cloud computing environment according to one or more embodiments of the present invention.

One or more embodiments of the present invention described herein provide dynamic picture sizing based on user access criteria. In accordance with one or more embodiments of the present invention, high resolution pictures are uploaded to servers that host websites. When a user selects a picture for viewing from a website, the resolution of the picture presented to the user is dynamically adjusted based on user access criteria. In addition, the picture can also be dynamically sized based on user access criteria and/or user request.

When a typical user logs in to a social network, the user may have lots of friends' pictures and news in his/her newsfeed. The resolution of the rendering of images, or pictures, can be determined dynamically by one or more embodiments of the present invention based on user access criteria. Examples of user access criteria include, but are not limited to: specifications of a user device that the user is using to view the picture; a bandwidth available to transmit the picture; a data plan limitation of the user at the user device; storage space on the user device; connection speed of the user device; network configurations; a social relationship or other connection between the user and an subject or person in the picture; and/or the social relationship between the image owner and the user. For example, if the user is a close friend of Mary, then Mary's pictures can be rendered at a higher resolution. If the user is only an acquaintance with Peter, then Peter's pictures can be rendered at a lower resolution as the user may not be interested in viewing those pictures from Peter in detail.

One or more embodiments of the present invention determine the social relationships (e.g., close friend, acquaintance) based on content of a social networking website (e.g., are they "friends" or otherwise connected) and/or past actions of the parties (e.g., emails, and how often they interact). Analytics can also be used to determine how close of a relationship two friends have, based on the likes and comments they have on each other's posts. Analytics can also be used to cross reference how many services the friends are connected through, such as, but not limited to: being Facebook friends; following each other on Twitter and Instagram or other social networks; and/or messaging each other on different messaging services such as Facebook Messenger, Google Hangouts or other messaging applications. The more of these connections the closer the friendship.

As used herein, the term "resolution" refers to a number of distinct pixels (or other elements) that make up an image, or picture. As the resolution increases, the quality of the picture increases since the image becomes sharper, more defined, and more detailed. The term "full resolution" as used herein refers to the maximum resolution available for the display, or other device, that is being used to view the picture. As used herein, the terms "high resolution" and "low resolution" are relative terms, with a picture in high resolution having more pixels than the same picture in low resolution. The term "original resolution" refers to the resolution of the picture when it is uploaded and stored in a server for access by the website. The original resolution of the picture is the highest possible resolution for viewing.

As used herein, the term "picture" and "image" are used interchangeably to refer to a computer image that has been created or copied and stored in electronic form. A picture can be made up of pixels (or other binary or vector representation) to represent visual information such as, but not limited to: drawings, photographs, graphs, logos, and individual video frames. A picture can be stored in any format known in the art such as, but not limited to: joint photographic experts group (JPEG); tagged image file format (TIFF); computer graphics metafile (CGM); and portable document format (PDF).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
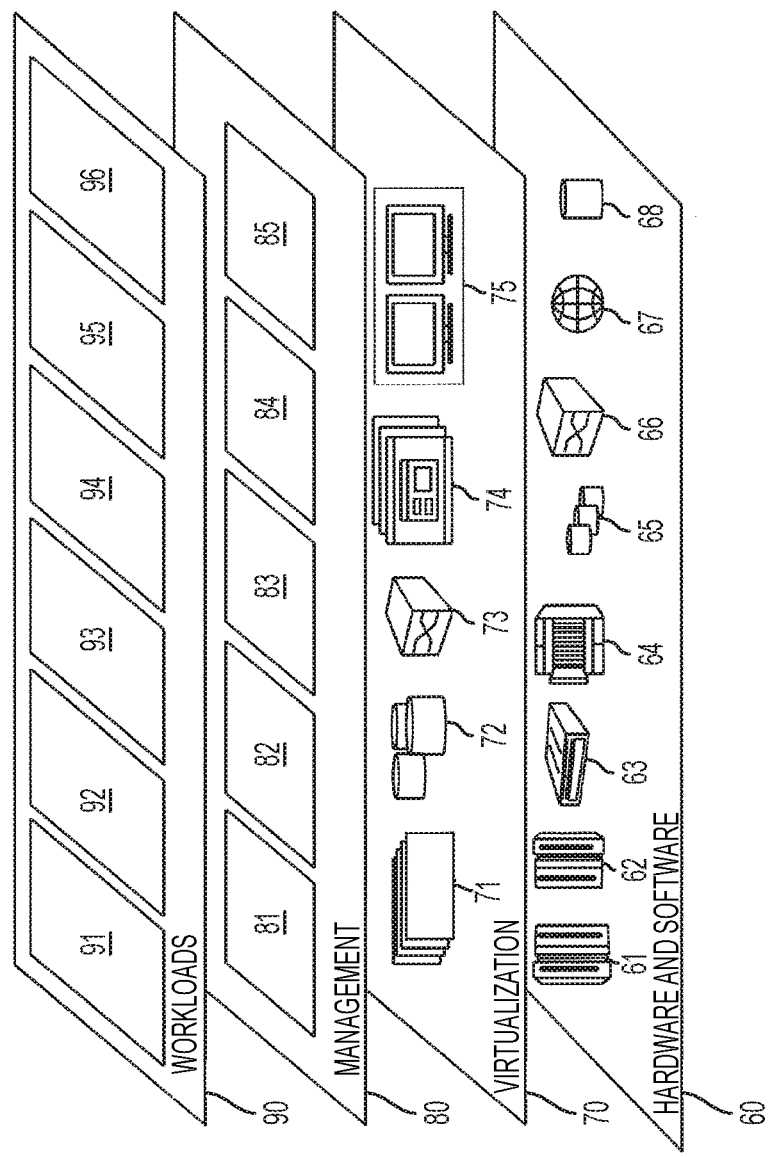
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic picture sizing 96.

Figure 3:
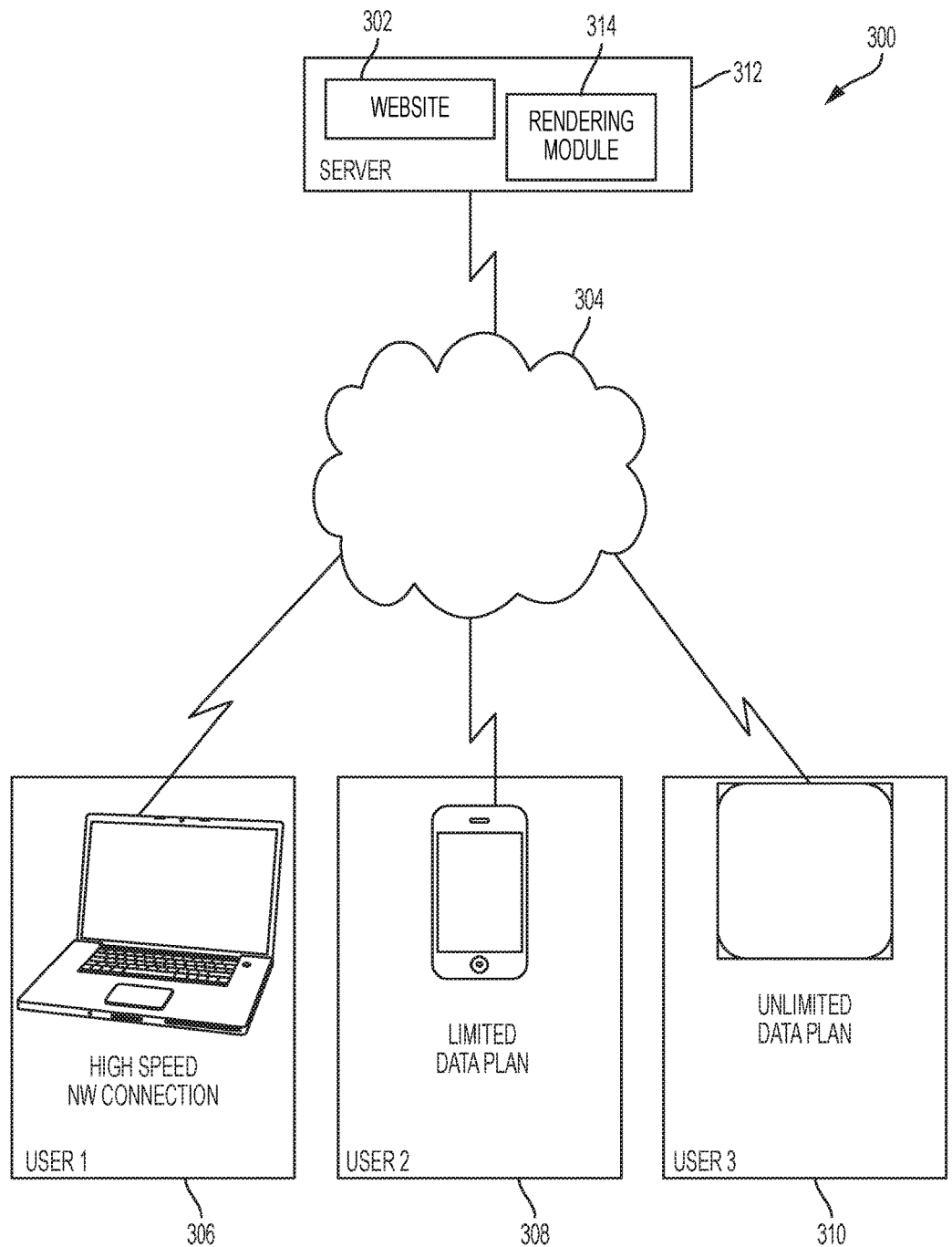
FIG. 3 depicts a block diagram of a system for dynamic picture sizing in accordance with one or more embodiments of the present invention.

Turning now to FIG. 3, a block diagram of a system 300 for dynamic picture sizing is generally shown in accordance with one or more embodiments of the present invention. FIG. 3 shows a website 302 that is being accessed via one or more networks 304 by different users labeled User 1 306, User 2 308, and User 3 310. The website 302 shown in FIG. 3 is located on, or being managed by, a server 312. As shown in FIG. 3, users who access the same website 302 may be using different devices and they may have different access patterns. For example, the website 302 may be a social networking website that includes pictures, such as Facebook. As shown in FIG. 3, the different users are accessing the website 302 at the same time. User 1 306 may be accessing Facebook using a home computer (e.g., desktop, laptop) and a high speed Internet connection. User 2 308 may be accessing Facebook using a cellular telephone with a limited data plan (e.g., 1 gigabyte per month) and may rarely zoom-in on or request larger sized pictures on the website 302. User 3 310 may be accessing Facebook using an iPad® with an unlimited data plan and may usually request larger sized pictures by clicking into the pictures to zoom-in for clarity.

As shown in FIG. 3, the server 312 includes a rendering module 314 for performing dynamic picture sizing based on user access criteria in accordance with one or more embodiments of the present invention described herein. Analytics about a user, such as social connections to pictures and/or viewing patterns can be performed by the rendering module 314. In accordance with one or more embodiments of the present invention, the rendering module 314 interacts with computer instructions located on the user devices (e.g., home computer of User 1 306, cellular telephone of User 2 308, iPad of User 3 310) to receive access criteria and/or to display a rendering of a picture of particular sizes or resolutions.

As used herein, the term "rendering" refers to the process of generating an image from a model, object or an existing image. A rendered image, or rendering of an image, can be generated by modifying a number of visible features including and not limited to shading, texture-mapping, depth of field, resolution and more.

In accordance with one or more embodiments of the present invention, the rendering module 314 includes computer instructions that capture the user's behavior and access requirements in order to develop a recommendation for rendering pictures on the user's device. For example, the rendering module 314 may intercept the rendering of a picture on the website 302 for the user device used by User 2 308 and generate a modified rendering with a lower resolution for the user device used by User 2. This modified rendering can be based on User 2 308 being on a limited data plan and on past behavior of User 2 308 not indicating any need for high resolution pictures to be shown. Conversely, User 1 306 and User 3 310 may not have limits on their data plans so the rendering modules 314 can render pictures at higher resolutions for User 1 306 and User 3 310. In addition, when User 3 310 for example, requests a larger sized picture, one or more embodiments of the rending module 314 can render a larger sized picture which may be at a higher resolution, such as the highest resolution supported by the iPad (up to the resolution of the picture when it was uploaded or the "original resolution") being used by User 3310.

In accordance with one or more embodiments of the present invention, user access criteria can also include relationships (e.g., social relationships) and the resolution of an image can be determined based on a relationship between the viewer and the content provider and/or the content of the picture. For example, suppose the viewer is named John, John accesses Facebook, and John's newsfeed contains content from Peter, Mary, Susan, and other friends. In accordance with one or more embodiments of the present invention, the relationship between John and each individual is analyzed in order to determine the resolution of the images to be sent to John. In accordance with one or more embodiments of the present invention, close relationships (e.g., friend) with a content provider result in higher resolution images than non-existent or less close relationships (e.g., acquaintance) with the content provider.

One or more embodiments of the rendering module 314 can also determine a relationship between John and content (e.g., a person, a subject) of a particular picture. For example, Michael may be an acquaintance of John and a close friend of Mary. However, Michael may upload an image that has Mary in the picture. The resolution of the image presented to John that has Mary in it can be presented to John with a higher resolution because of his social relationship with Mary. In one example, the viewer is John, John accesses Facebook, and John's newsfeed on Facebook contains content from Peter, Mary, Susan, and other friends. One or more embodiments of the rendering module 314 can analyze the relationship between John and each individual to determine the resolution of the images that contain these individuals. The closer the relationships, the higher the resolution.

One or more embodiments of the rendering module 314 can also determine a relationship between John and a subject of a particular picture. As used herein, the term "subject" refers to any content of a picture that is not an identified person. A subject can include, but is not limited to: a place such as the user's home or Glacier National Park, a type of object such as kittens or views of mountains; and a pet or particular animal. For example, John may frequently access pictures of rainbows and rarely access pictures of rivers, and the rendering module 314 can provide John with renderings of pictures of rainbows that are at a higher resolution than the renderings of pictures of rivers that are provided to John.

The rendering module 314 can be used to determine the different relationships. For example, if John clicks on newsfeed items from Mary a specified number of times within a timeframe, then Mary can be determined to be a close friend of John's and therefore pictures containing Mary should be of a higher resolutions than pictures that do not contain close friends of John's. Mary can be determined to be a close friend of John's based on other criteria such as, but not limited to: John regularly zooms in on pictures that contain Mary; Mary is located in John's contact database; and John specifies that Mary is a close friend. A variety of friend categories can be implemented based on different criteria and/or different thresholds. Examples of friend categories can include, but are not limited to: close friend; friend; acquaintance; and stranger. Friends can also be distinguished based on networks such as, but not limited to professional networks and social networks.

Thus, one of more embodiments of the rendering module 314 has an analytical component that analyzes the access criteria of the viewing user, the owner of the images (e.g., to see if the owner has any relationships with the user), and the content of the picture (e.g., people and subjects to see if they have any relationships with the user). Based on the analysis, the rendering module 314 determines the resolution of the image to be rendered for display to the user.

A person can be identified in a picture by being tagged in that picture. For example, if John has taken a picture of himself with Mary, when he uploads that picture to a social network he can tag Mary in that picture. This tagging is one way to identify the people in the picture. Also, services such as Facebook use algorithms to try and guess the people who are in each picture when they are uploaded to help the person posting the picture, such as John, easily tag the people in the pictures. The location of the picture or post can be determined by metadata attached to the picture when it is uploaded. This data is sometimes collected when the picture is taken and this data sometimes includes location data based off of a phone's global positioning system (GPS) sensors and cellular connection. In addition, when posting pictures to social media, a user such as John can also post the location of where he was and tag his friends such as Mary in the post. These posts can be used to show the relationship between John and Mary.

Figure 4:
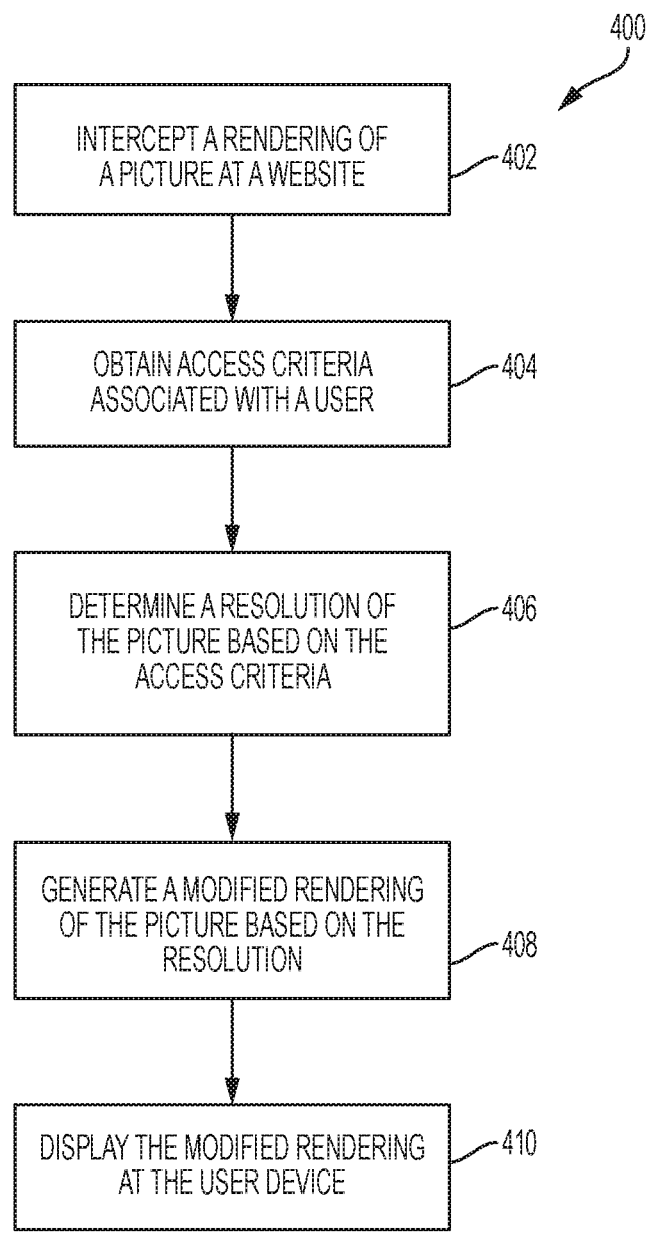
FIG. 4 depicts a flow diagram of a process for dynamic picture sizing in accordance with one or more embodiments of the present invention.

Turning now to FIG. 4, a flow diagram of a process 400 for dynamic picture sizing is generally shown in accordance with one or more embodiments of the present invention. All or a portion of the processing shown in FIG. 4 can be performed by computer instructions contained in the rendering module 314 shown in FIG. 3 executing on a processor. At block 402, a rendering of a picture in a website hosted by the server is intercepted. When the user device requests the picture for rendering it can provide the rendering module 314 with information about what kind of user device is doing the requesting. Examples of user devices include but are not limited to: a cellular telephone on a limited data plan; a tablet computer on unlimited WIFI; and a desktop computer on an unlimited wired home Internet connection. The rendering module 314 then uses this information as access criteria, possibly along with other access criteria, to select the best resolution for the type of user device that is being used for the viewing and the type of connection the user device has to the server. In accordance with one or more embodiments of the present invention, the picture was previously uploaded to the website by a content provider and stored at an original resolution. In accordance with one or more embodiments of the present invention, the original resolution is the highest resolution available to the content provider when the picture was uploaded. The higher the original resolution, the more detailed viewing that can be provided when requested for example, by a request for a larger version of a picture.

At block 404, access criteria associated with the user is obtained. As described previously, the access criteria can include system constraints such as, but not limited to: bandwidth; data plan limits; storage space on the user device; network configurations; connection speed; user device characteristics (e.g., highest resolution supported by the user device, processor speed). The access criteria can also include relationship constraints such as, but not limited to: different resolutions for different relationships (e.g., highest resolution for friends, lowest for acquaintances) between the viewer and the content provider and/or the content of the picture.

The access criteria can also include past viewing habits of the user for the specific content (e.g., does the user usually zoom-in on and/or request high resolution pictures of John) or similar types of content (e.g., does the user usually zoom-in on and/or request high resolution pictures of particular types or groupings of people or particular types of landscapes or particular types of objects).

The access criteria can also include a time element. For example, Mary may spend about ten minutes at noon and one hour at six every day on a social network website. This information can be used to determine, for example, that lower resolution pictures should be sent to Mary for quick viewing at noon and that higher resolution pictures should be sent at six.

The access criteria described herein is intended to be exemplary and not limiting, as any access criteria that can be used to determine a resolution for a picture can be implemented by one or more embodiments of the present invention. All or a portion of the access constraints for a user can be stored on the user device and accessed by, or transmitted to, the rendering module 314. All or a portion of the user access criteria for a user can be dynamically determined by the rendering module 314 in response to intercepting a rendering of an image. In accordance with one or more embodiments of the present invention, the rendering module 314 analyzes at least a subset of the above access criteria to determine, at block 406, a resolution for a modified rendering of the picture whose rendering was intercepted.

At block 408, the modified rendering of the picture is generated based at least in part on the resolution determined at block 406. In accordance with one or more embodiments of the present invention, the modified rendering is at the resolution determined at block 406. At block 410, the modified rendering is displayed at the user device. A request for a larger version of the picture can be received and a second modified rendering of the picture that includes a larger picture possibly at a higher resolution can be rendered In accordance with one or more embodiments of the present invention described herein, the picture size is increased only upon a user's request to increase the size of the picture.

Figure 5:
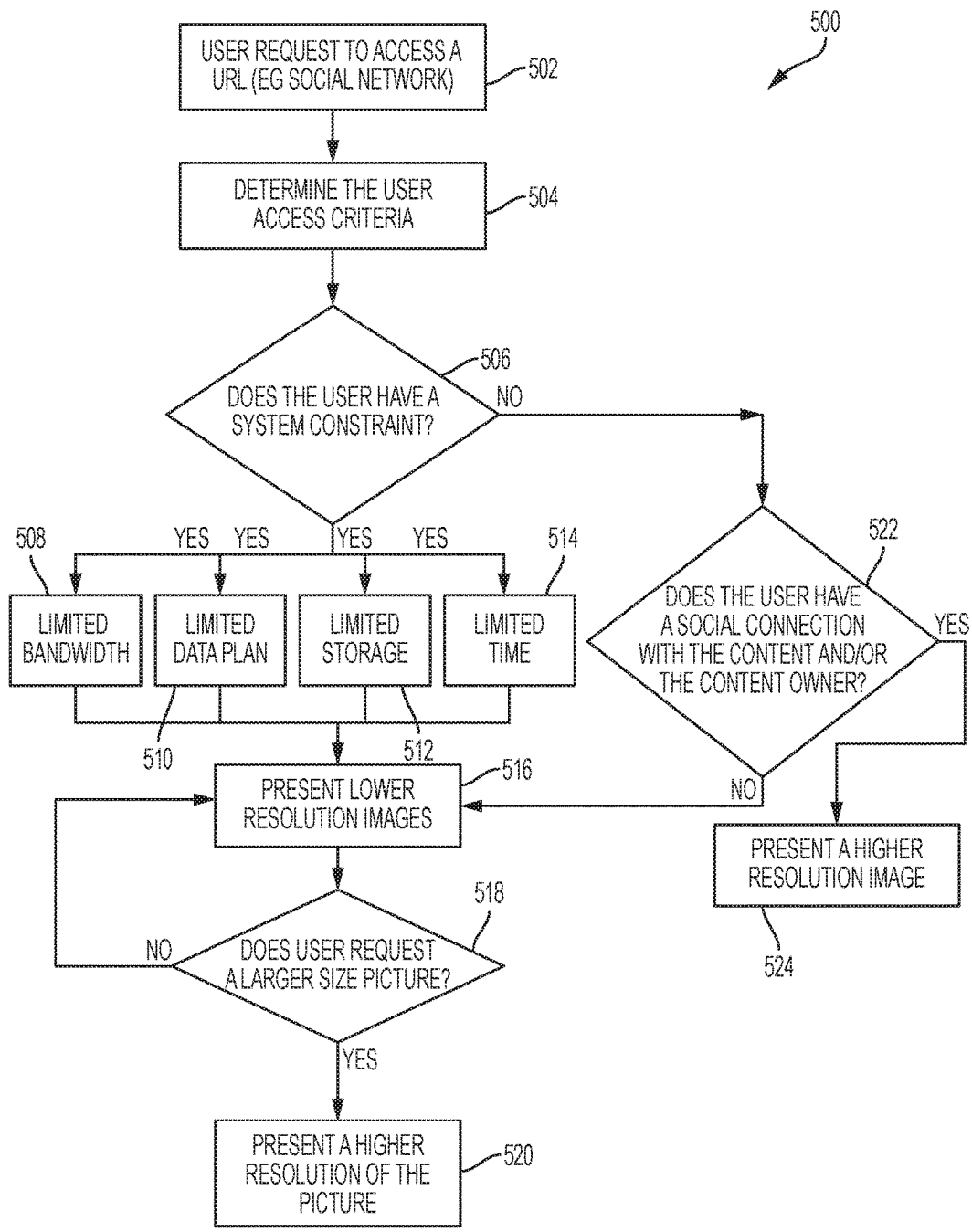
FIG. 5 depicts a flow diagram of a process for dynamic picture sizing in accordance with one or more embodiments of the present invention.

Turning now to FIG. 5, a flow diagram of a process 500 for dynamic picture sizing is generally shown in accordance with one or more embodiments of the present invention. All or a portion of the processing shown in FIG. 5 can be performed by computer instructions contained in the rendering module 314 shown in FIG. 3 executing on a processor. The process 500 shown in FIG. 5 is one example of a process that can be implemented by one or more embodiments of the present invention for performing dynamic picture sizing based on user access criteria.

At block 502, a user requests access to a uniform resource locator (URL) and at block 504, the user access criteria associated with the user is determined. At block 506 it is determined if the user access criteria indicate restrictions based on system constraints associated with the user or user device. Example of system constraints shown in FIG. 5 includes limited bandwidth 508, limited data plan 510, limited storage 512, and limited time 514. The presence of one or more of these system constraints results in lower resolution images being presented to the user at block 516. In one of more embodiments of the present invention, access criteria includes the user's system constraints. For example, a user named Mary may spend five minutes during her coffee break to access Instagram from her cell phone and another five minutes on Instagram from her home computer after work. Mary has limited data plan and storage for her cell phone. Based on Mary's access criteria, pictures of Instagram rendered for Mary on her cell phone are of lower resolution than pictures of Instagram rendered for her on her home computer. In addition, whether the user has limited time or not when he or she accesses a website can be determined by his or her past viewing behavior. In one or more embodiments of the present invention, the access criteria include the users past viewing behavior. For example, a user named John may usually spend ten minutes during his lunch break to access Facebook and more time after dinner to access Facebook. Based on John's viewing behavior, pictures on Facebook can be rendered at a lower resolution to John's device when he accesses Facebook during his lunch break, while pictures on Facebook can be rendered at a higher resolution to John's device when he accesses Facebook after dinner.

It is determined at block 518, whether the user has requested the picture in a larger size. If the user has requested a larger size of the picture, then processing continues at block 520 with a larger sized picture and a higher resolution of the picture being presented to the user.

If the user access criteria do not include system constraints, as determined at block 506, then block 522 is performed to determine if the user has a social connection to the content of the picture and/or to the content owner of the picture. If the user has a social connection, then block 524 is performed and a higher resolution picture is presented to the user.

Figure 6:
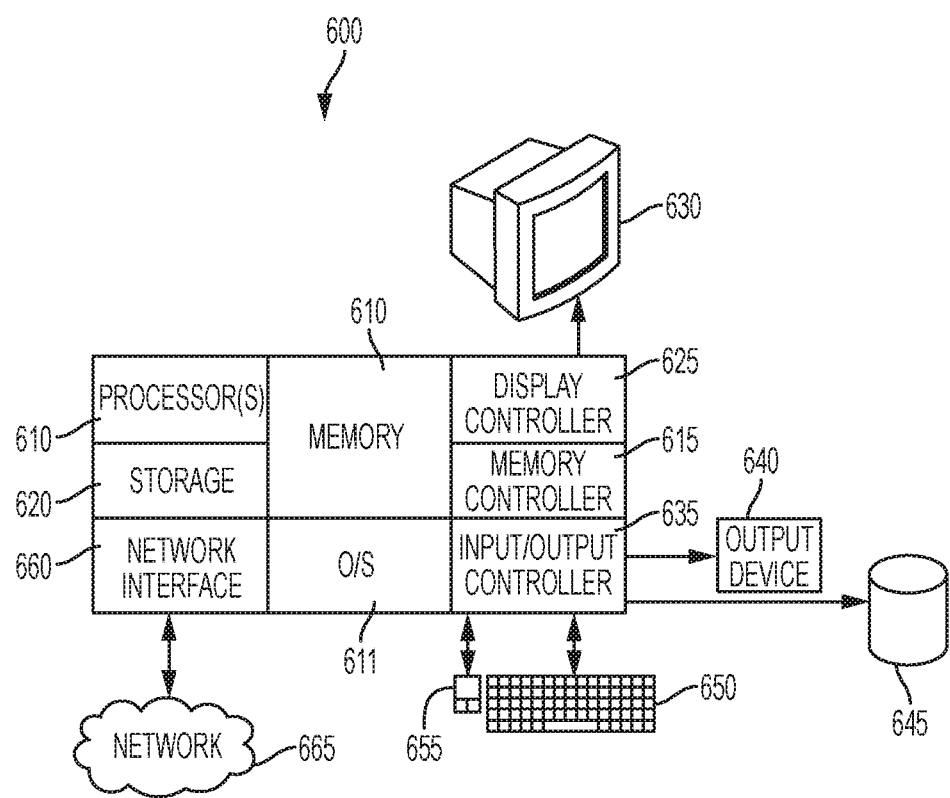
FIG. 6 is a block diagram of a computing device for implementing some or all aspects of a system for dynamic picture sizing in accordance with one or more embodiments of the present invention.

Turning now to FIG. 6, a block diagram of a computer system 600 for use in implementing some or all aspects of a system for implementing dynamic picture sizing is generally shown according to one or more embodiments of the present invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 600, such as a personal computer, workstation, minicomputer, or mainframe computer.

In an exemplary embodiment, as shown in FIG. 6, the computer system 600 includes a processor 605, memory 610 coupled to a memory controller 615, and one or more input devices 645 and/or output devices 640, such as peripherals, that are communicatively coupled via a local I/O controller 635. These devices 640 and 645 may include, for example, a printer, a scanner, a microphone, and the like. A conventional keyboard 650 and mouse 655 may be coupled to the I/O controller 635. The I/O controller 635 may be, for example, one or more buses or other wired or wireless connections, as are known in the art. The I/O controller 635 may have additional elements, which are omitted for simplicity, such as controllers, buffers (caches), drivers, repeaters, and receivers, to enable communications.

The I/O devices 640, 645 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 605 is a hardware device for executing hardware instructions or software, particularly those stored in memory 610. The processor 605 may be a custom made or commercially available processor, a central processing unit (CPU), an auxiliary processor among several processors associated with the computer system 600, a semiconductor based microprocessor (in the form of a microchip or chip set), a macroprocessor, or other device for executing instructions. The processor 605 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 610 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, or other types of storage media. Note that the memory 610 may have a distributed architecture, where various components are situated remote from one another but may be accessed by the processor 605.

The instructions in memory 610 may include one or more separate programs, each of which comprises an ordered listing of executable instructions for implementing logical functions. In the example of FIG. 6, the instructions in the memory 610 include a suitable operating system (OS) 611. The operating system 611 essentially may control the execution of other computer programs and provides scheduling, input-output control, file and data management, memory management, and communication control and related services.

Additional data, including, for example, instructions for the processor 605 or other retrievable information, may be stored in storage 620, which may be a storage device such as a hard disk drive or solid state drive. The stored instructions in memory 610 or in storage 620 may include those enabling the processor to execute one or more aspects of the dispatch systems and methods of this disclosure.

The computer system 600 may further include a display controller 625 coupled to a display 630. In an exemplary embodiment, the computer system 600 may further include a network interface 660 for coupling to a network 665. The network 665 may be an IP-based network for communication between the computer system 600 and an external server, client and the like via a broadband connection. The network 665 transmits and receives data between the computer system 600 and external systems. In an exemplary embodiment, the network 665 may be a managed IP network administered by a service provider. The network 665 may be implemented in a wireless fashion, e.g., using wireless protocols and technologies, such as WiFi, WiMax, etc. The network 665 may also be a packet-switched network such as a local area network, wide area network, metropolitan area network, the Internet, or other similar type of network environment. The network 665 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for providing embodiments of the present invention described herein can be embodied, in whole or in part, in computer program products or in computer systems 600, such as that illustrated in FIG. 6.

The terminology used herein is for the purpose of describing particular embodiments of the invention only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments of the invention were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a memory having computer readable instructions; and
one or more processors for executing the computer readable instructions, the computer readable instructions controlling the one or more processors to perform operations comprising:
intercepting a rendering of a picture at a website, the picture uploaded to a server of the website by a content provider;
determining a resolution of a modified rendering of the picture for display at a user device of a user, the determining a resolution based at least in part on past viewing behavior of the user, the past viewing behavior of the user including a first amount of time previously spent by the user at the website during a first time of day and a second amount of time previously spent by the user at the website during a second time of day, the first amount of time shorter than the second amount of time, wherein based on the intercepting occurring during the first time of day it is determined that the resolution is a first resolution and based on the intercepting occurring during the second time of day it is determined that the resolution is a second resolution that is higher than the first;
generating the modified rendering of the picture based at least in part on the resolution; and
displaying the modified rendering of the picture at the user device.

2. The system of claim 1, wherein the operations further comprise:
intercepting a request from the user to view a larger size of the picture; and
generating a second modified rendering of the picture that is at a higher resolution than the resolution of the modified rendering.

3. The system of claim 1, wherein the determining a resolution is further based at least in part on content of the picture and the content of the picture includes a person.

4. The system of claim 1, wherein the determining a resolution is further based at least in part on content of the picture and the content of the picture includes a subject.

5. The system of claim 1, wherein the determining a resolution is further based at least in part on a relationship between the user and one or both of the content provider and content of the picture are received from the user device.

6. The system of claim 1, wherein the determining a resolution is further based at least in part on system constraints.

7. A computer program product comprising a computer readable storage medium having program instructions embodied therewith, the program instructions executable by a processor to cause the processor to perform operations comprising:
intercepting, using a processing system, a rendering of a picture at a web site, the picture uploaded to a server of the website by a content provider;
determining, using the processing system, a resolution of a modified rendering of the picture for display at a user device of a user, the past viewing behavior of the user including a first amount of time previously spent by the user at the website during a first time of day and a second amount of time previously spent by the user at the website during a second time of day, the first amount of time shorter than the second amount of time, wherein based on the intercepting occurring during the first time of day it is determined that the resolution is a first resolution and based on the intercepting occurring during the second time of day it is determined that the resolution is a second resolution that is higher than the first;

generating, using the processing system, the modified rendering of the picture based at least in part on the resolution; and displaying the modified rendering of the picture at the user device.

8. The computer program product of claim 7, wherein the operations further comprise:

intercepting a request from the user to view a larger size of the picture; and generating a second modified rendering of the picture that is at a higher resolution than the resolution of the modified rendering.

9. The computer program product of claim 7, wherein the determining a resolution is further based at least in part on content of the picture and the content of the picture includes a person.

10. The computer program product of claim 7, wherein the determining a resolution is further based at least in part on a relationship between the user and one or both of the content provider and content of the picture are received from the user device.

11. The computer program product of claim 7, wherein the determining a resolution is further based at least in part on system constraints.

* * * * *